United States Patent [19]
Takeuchi et al.

[11] Patent Number: 5,926,626
[45] Date of Patent: Jul. 20, 1999

[54] NETWORK BRIDGE USING ONLY HARDWARE TO PROCESS MEDIA ACCESS CONTROL (MAC) PACKET-SWITCHING OPERATIONS

[75] Inventors: Yorihisa Takeuchi; Koichi Kihara; Kenichi Uchino; Jiro Asoh, all of Tokyo, Japan

[73] Assignee: OKI Electric Industry Co., Ltd., Tokyo, Japan

[21] Appl. No.: 08/825,533

[22] Filed: Mar. 28, 1997

[30] Foreign Application Priority Data

May 16, 1996 [JP] Japan .................................. 8-121384

[51] Int. Cl.⁶ .................................................. H04L 12/46
[52] U.S. Cl. ........................................................ 395/200.79
[58] Field of Search ............... 395/200.79; 370/401–405

[56] References Cited

U.S. PATENT DOCUMENTS

| | | | |
|---|---|---|---|
| 5,136,580 | 8/1992 | Videlock et al. | 370/60 |
| 5,249,178 | 9/1993 | Kurano et al. | 370/60 |
| 5,293,489 | 3/1994 | Furui et al. | 395/200 |
| 5,329,618 | 7/1994 | Moati et al. | 395/200 |
| 5,448,565 | 9/1995 | Chang et al. | 370/85.13 |
| 5,570,365 | 10/1996 | Yoshida | 370/85.6 |
| 5,694,556 | 12/1997 | Neal et al. | 395/308 |
| 5,802,319 | 9/1998 | Faulk, Jr. et al. | 395/200.79 |

OTHER PUBLICATIONS

Computer & Network LAN, pp. 95–100.
Buyer's Guide, Ethernet Switching HUB, pp. 140–148.

*Primary Examiner*—Lance Leonard Barry
*Attorney, Agent, or Firm*—Rabin & Champagne, PC

[57] ABSTRACT

A bridge device for connecting networks together via data link layers, that assigns input port numbers unique to each port, to headers of input memory access control packets. A content-addressable memory stores destination addresses and groups of port numbers corresponding to the destination addresses. A determiner such as a controller determines whether or not a destination address of a memory access control packet is stored in the memory and determines whether or not a port number corresponding to the destination address coincides with an input port number of the memory access control packet. Based on the determinations made by the determiner, a selector selects one of the following as an output port number: either a port number corresponding to the destination address, or a port number designating all ports other than the input port, or a port number not designating any ports. An output port number assigner assigns an output port number to a memory access control port. Output filters such as gate circuits sequentially receive memory access control packets output by the assigner, and determine whether or not the output port numbers assigned to the headers of the packets are numbers of the ports to which the filters are themselves connected and allow passage of only those packets with the self-designating output port numbers, which are therefore actually addressed to their own output port.

4 Claims, 8 Drawing Sheets

FIG.3(A)
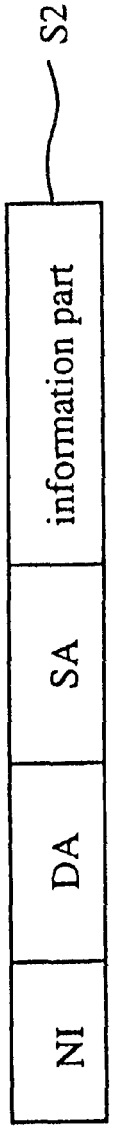
FIG.3(B)  NI=0001
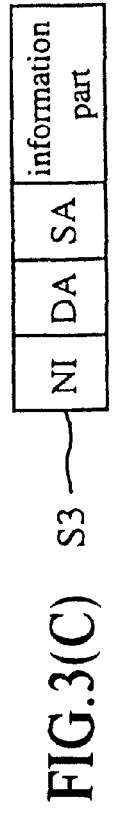
FIG.3(C) S3 — multiplexed at four or more times the bit rate Example of NI

| input port | when there are four (4 x 4) input/output ports | when there are eight (8 x 8) input/output ports |
|---|---|---|
| # 1 | 0 0 0 1 | 0 0 0 0 0 0 0 1 |
| # 2 | 0 0 1 0 | 0 0 0 0 0 0 1 0 |
| # 3 | 0 1 0 0 | 0 0 0 0 0 1 0 0 |
| # 4 | 1 0 0 0 | 0 0 0 0 1 0 0 0 |
| # 5 | | 0 0 0 1 0 0 0 0 |
| # 6 | | 0 0 1 0 0 0 0 0 |
| # 7 | | 0 1 0 0 0 0 0 0 |
| # 8 | | 1 0 0 0 0 0 0 0 |

FIG.4

Example of filtering using output port number filters

| output port | when there are four (4 x 4) input/output ports | when there are eight (8 x 8) input/output ports |
|---|---|---|
| # 1 | x x x 1 | x x x x x x x 1 |
| # 2 | x x 1 x | x x x x x x 1 x |
| # 3 | x 1 x x | x x x x x 1 x x |
| # 4 | 1 x x x | x x x x 1 x x x |
| # 5 | | x x x 1 x x x x |
| # 6 | | x x 1 x x x x x |
| # 7 | | x 1 x x x x x x |
| # 8 | | 1 x x x x x x x | x : don't care
1 : output and determination to the port (discarded if zero)

FIG.5

NI=0001,DA=all 1 or DA is not yet recorded
  0001
  1110
  don't care
  don't care
  don't care
or { 2E : no match  
    2F : don't care }
  DA=all 1
  1110

NO=1110
FIG.7(J) #1 discard
FIG.7(K) #2 send 
FIG.7(L) #3 send 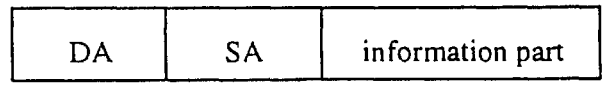
FIG.7(M) #4 send 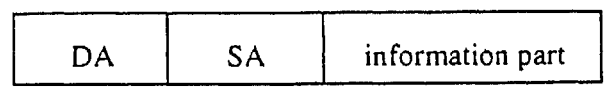

NI=0001,NC=0100,DA ≠ all 1
  0001
  1110
  0100
  NI≠NC
  match
  DA≠all 1
  0100

NO=0100
FIG.8(J) #1 discard
FIG.8(K) #2 discard
FIG.8(L) #3 send 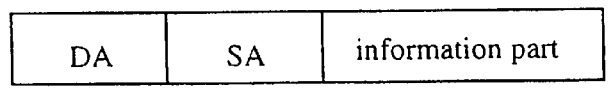
FIG.8(M) #4 discard FIG.9(A) | NI | DA | SA | information part |
NI=0001(=NC), DA ≠ all 1

FIG.9(B) XXX 0001 XXXXXXXX

FIG.9(C) XXX 1110 XXXXXXXX

FIG.9(D) XXX 0001 XXXXXXXX

FIG.9(E) XXX NI=NC XXXXXXXX

FIG.9(F) XXX match XXXXXXXX

FIG.9(G) XXX DA≠all 1 XXXXXXXX

FIG.9(H) XXX 0000 XXXXXXXX

FIG.9(I) | NO | DA | SA | information part |
NO=0000

FIG.9(J) #1 discard

FIG.9(K) #2 discard

FIG.9(L) #3 discard

FIG.9(M) #4 discard

NETWORK BRIDGE USING ONLY HARDWARE TO PROCESS MEDIA ACCESS CONTROL (MAC) PACKET-SWITCHING OPERATIONS

BACKGROUND OF THE INVENTION

1. Field of the Invention

The present invention relates to a bridge device for connecting together, for example, Local Area Networks (hereinafter referred to simply as "LANs").

2. Description of Related Art

Conventionally, nodes (i.e. computers or printers, etc.) connected together on a network have often all been connected to a central location known as a "hub". These hubs originally often comprised merely a wiring panel or block where wires from each individual node were gathered together. A data packet from one node on the network to another node on the network would then pass through this passive hub.

As networks have become more comprehensive, however, these passive hubs have been replaced by active hubs or repeaters that re-clock and amplify signals for the data packets before sending the packets to other parts of the network. A repeater, or when the repeater has a number of ports, a multiport repeater, handles data packets in a conference call manner, where every node on the network hears the conversation of every other node on the network. Therefore, on a shared network the available bandwidth is shared between all of the nodes on the network with available bandwidth being reduced for each node as new nodes are added to the network. The widespread use of personal computers has therefore resulted in ever-increasing strain being placed on the bandwidth of existing networks. This also results in an increased number of collisions and reduced throughput.

Packet-switching hubs (hereinafter referred to for simplicity as "switching hubs") have therefore been introduced in recent years to combat this problem. A switching hub is an active device that looks at each network packet to determine its destination and then forwards each packet to the appropriate port. The packet is then only seen by its destination port. Switching hubs are therefore particularly useful for isolating traffic on one branch of a network from that of another branch. A switching hub also increases the overall bandwidth of the network when a plurality of nodes are communicating at the same time, so the full network bandwidth can be occupied and stability is improved as data is only sent to the required destination.

A switching hub operates by receiving a data packet, translating the destination address of the data packet, and transmitting the data packet to the port to which the destination node is connected. In order to do this, Media Access Control (hereinafter referred to simply as "MAC") addresses of nodes connected to each port have to be known. This is generally carried out using the same method as for a learning bridge, i.e. a node address table for each node connected is made based on the send addresses of data packets received from each port. Here, data packets of unknown destinations and data packets having broadcast addresses are sent to all ports.

Methods for hub switching are generally divided into the "on the fly" method (also referred to as the "cut-through" method), the "store and forward" method and the "fragment-free" method.

In the on the fly method, a destination address field exists at the head of a data packet. The switching hub then receives the destination field first and a field check sequence field last. Then, just the destination field that is received first is looked at, the destination port of the data packet is determined and the data packet is soon sent. The time delay from receiving the data packet to transmitting the data packet is therefore small. The on the fly method is therefore closer to the operation of a conventional Hub than a bridge device (to be described later) and therefore has the same following three problems, i.e. a data packet is discarded when its output port is already being used, error data packets are transmitted, and transmission is not possible with networks of differing speeds. The store and forward method was therefore introduced to resolve these problems.

The store and forward method is, in effect, that of a bridge device and is similar to the system architecture commonly employed in electronic mail systems. Here, received data packets are temporarily stored in memory at a shared check area where the received data packets are checked and data packets with errors are discarded. The output ports of correct data packets are then determined from the destination addresses of these data packets and outputted when the destination output port becomes free. This temporary storing means that the delay between receipt and transmission is large (as in, for example, electronic mail systems) but the aforementioned three problems with the on the fly method are resolved.

In the fragment-free method, for example, a switching process is carried out where the packet is cut at 64 bytes, so that only short packets are detected.

Further, in a client-server system, there is the problem on shared mediums that bottlenecks occur when a large number of clients attempt to access a single server simultaneously. A method known as a "fat pipe" or "big pipe" method where the server port is given a sufficiently large bandwidth so that client traffic gathering at the server can be processed has been put forward to solve this problem, although this approach has been hindered by the fact that packet processing is usually carried out by software and is therefore relatively slow.

In addition to being used as a packet switcher within an individual LAN, this kind of packet switching device can also be applied to bridge devices by utilizing filtering functions and port characteristic functions to prevent collisions.

A bridge device is a transmission device for carrying out bidirectional data transmission across a plurality of networks connected via ports.

These bridge devices are usually realized by conventional software processes as in the well-known typical configuration shown in FIG. 1.

The basic configuration of the bridge device comprises a MAC packet-switching processor 1 realized by software on a processor system and a common memory 2. The MAC packet-switching processor I and the common memory 2 are connected together via interfaces 3 and 4 and a bus 5. Interfaces #1 to #n are connected to the bus 5 and MAC layers (for each network are connected together via the interfaces 6. Here, #1 to #n in FIG. 1 indicate numbers given to each port and shall be referred to as "port numbers" in the following. Different physical layers and LAN ports are connected to each MAC layer but, as this is common knowledge in the network field, a description of these differing physical layers and LAN ports is omitted here.

Next, a procedure for a MAC packet-switching process using a bridge device of this configuration is described.

MAC packets from the MAC layers received by the bridge device are temporarily stored in the common memory 2. When stored, these MAC packets are read at the MAC packet-switching processor I and MAC packet-switching is executed using prescribed software processes.

The packet-switching process consists of two processes, namely, a learning process and a packet-forwarding process.

The learning process is a process for recording or updating a filtering table (a table holding pairs of MAC addresses and port numbers) from a source address (SA: Source Address) in a MAC header of a MAC packet and a port number given to the port the MAC packet was inputted at.

On the other hand, the packet forwarding process is a process where the port to which the MAC packet is to be outputted is selected based on a destination address (DA: Destination Address) in the MAC header of the MAC packet and the filtering table.

In this packet forwarding process, the port to which an inputted MAC packet is sent is decided and the MAC packet is sent based on one of the following three cases.

(i) when an output destination destination port obtained by retrieving a port number corresponding to the destination address DA is a port other than the port receiving the aforementioned MAC packet, the MAC packet is sent to the MAC layer corresponding to the searched port.

(ii) when the port of the port number corresponding to the destination address is the actual port that received the MAC packet, the MAC packet is not transmitted (discarded).

(iii) when the destination address is all 1's (broadcast address) or is not yet recorded in the filtering table, the MAC packet is transmitted to the MAC layers of all of the ports other than the port that received the MAC packet.

However, a high-speed switching operation is limited because in this bridge device, MAC packet transmission destinations are successively decided by software processes operating on a processor system.

Further, with this bridge device, the delay time while writing to the common memory 2 is substantial because the transmission destination is decided after the inputted MAC packet is temporarily stored in the common memory 2 with the MAC packet then being read to the newly decided transmission destination.

SUMMARY OF THE INVENTION

It is therefore the object of the present invention to provide a bridge device for connecting together a large number of networks via data link layers so that the bridge may be realized using only hardware, packet switching may be carried out more rapidly, and data bottlenecks that plague modern networks when a large number of users access the same server simultaneously can be alleviated.

In order to achieve this object, a bridge device comprises an input port number assigner, content-adressable memory, a determiner, a selector, an output port assigner and output filters. The input port number assigner assigns input port numbers unique to each port to headers of inputted memory access control packets. The content-addressable memory stores destination addresses and groups of port numbers corresponding to the destination addresses. The determiner determines whether or not a destination address of a memory access control packet is stored in the content-addressable memory and whether or not a port number corresponding to the destination address is the same as an input port number of the memory access control packet. The selector selects as an output port number one of: a port number corresponding to the destination address (i.e. when the destination of a packet is known); a port number designating all ports other than the input port (when a packet is to be sent to everybody on a network); or a port number not designating any ports (when a packet is not to be sent to anybody), based on results of the determinations. The output port number assigner assigns an output port number to a memory access control packet. The output filters only allow memory access control packets that are actually addressed to their own output port to pass and do not allow packets that are addressed to other output ports to pass.

Here, the determiner can also determine whether or not the port number recorded for the destination address designates all ports.

The memory access control packet can also be held in a shift register while the determiner decides the output port number.

Further the memory access control packet with the input port number assigned can be multiplexed in packet units across all ports and supplied to the determiner.

In the bridge device of the present invention, the three basic operations of transmitting MAC packets to all ports, just a designated port or discarding a MAC packet can be achieved just using hardware because the basic operation for the selection process is based on whether or not port numbers are recorded or coincide.

For example, when a MAC packet destination address is not recorded in content-addressable memory, output port numbers designating all ports are selected and the MAC packet is outputted to all ports.

Further, when a MAC packet destination address is recorded in content-addressable memory, the port number corresponding to the recorded destination address and the input port number coincide and a port number not corresponding to any port is selected, this MAC packet is discarded. Moreover, when the port number corresponding to the destination address and the input port number coincide, the port number corresponding to the destination address is selected as the output port number and the MAC packet is outputted only to the port designated by this output port number.

BRIEF DESCRIPTION OF THE DRAWINGS

FIG. 3 is an illustration of a MAC packet;

FIG. 4 is a table showing example port numbers;

FIG. 5 is a table showing an example of filtering using output port number filters;

FIG. 9 is a view illustrating an example operation when a MAC packet is not transmitted.

DETAILED DESCRIPTION OF THE PREFERRED EMBODIMENT

Embodiment

The following is a description, with reference to the drawings, of an embodiment of a bridge device of the present invention.

(A) Bridge device configuration (A-1) Overall configuration.

Figure 1:
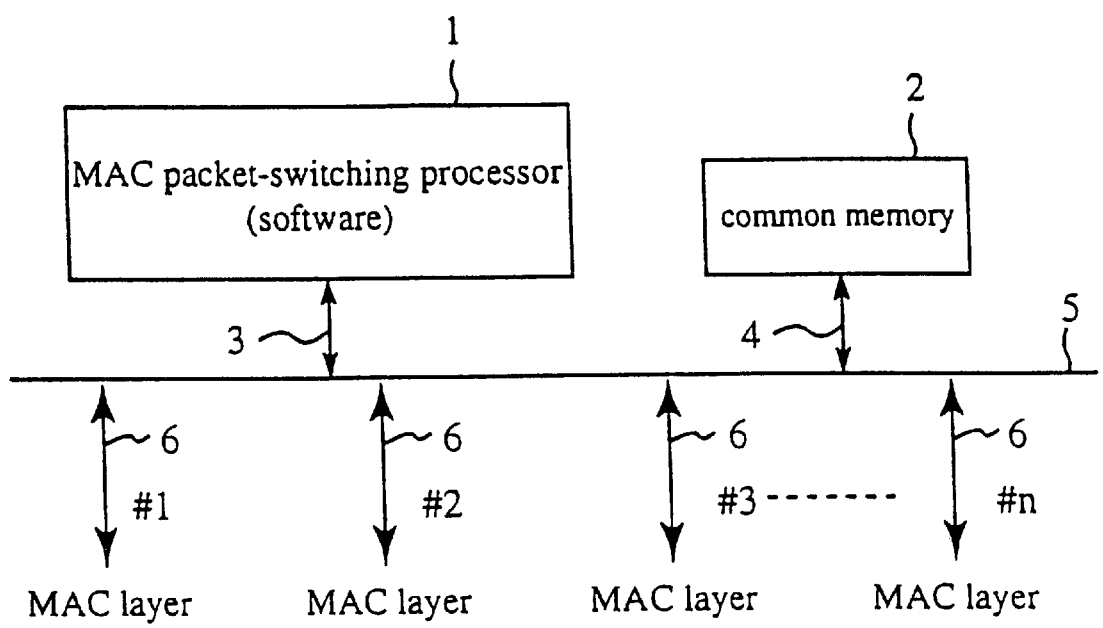
FIG. 1 is a functional block diagram showing a related bridge device.
Figure 2:
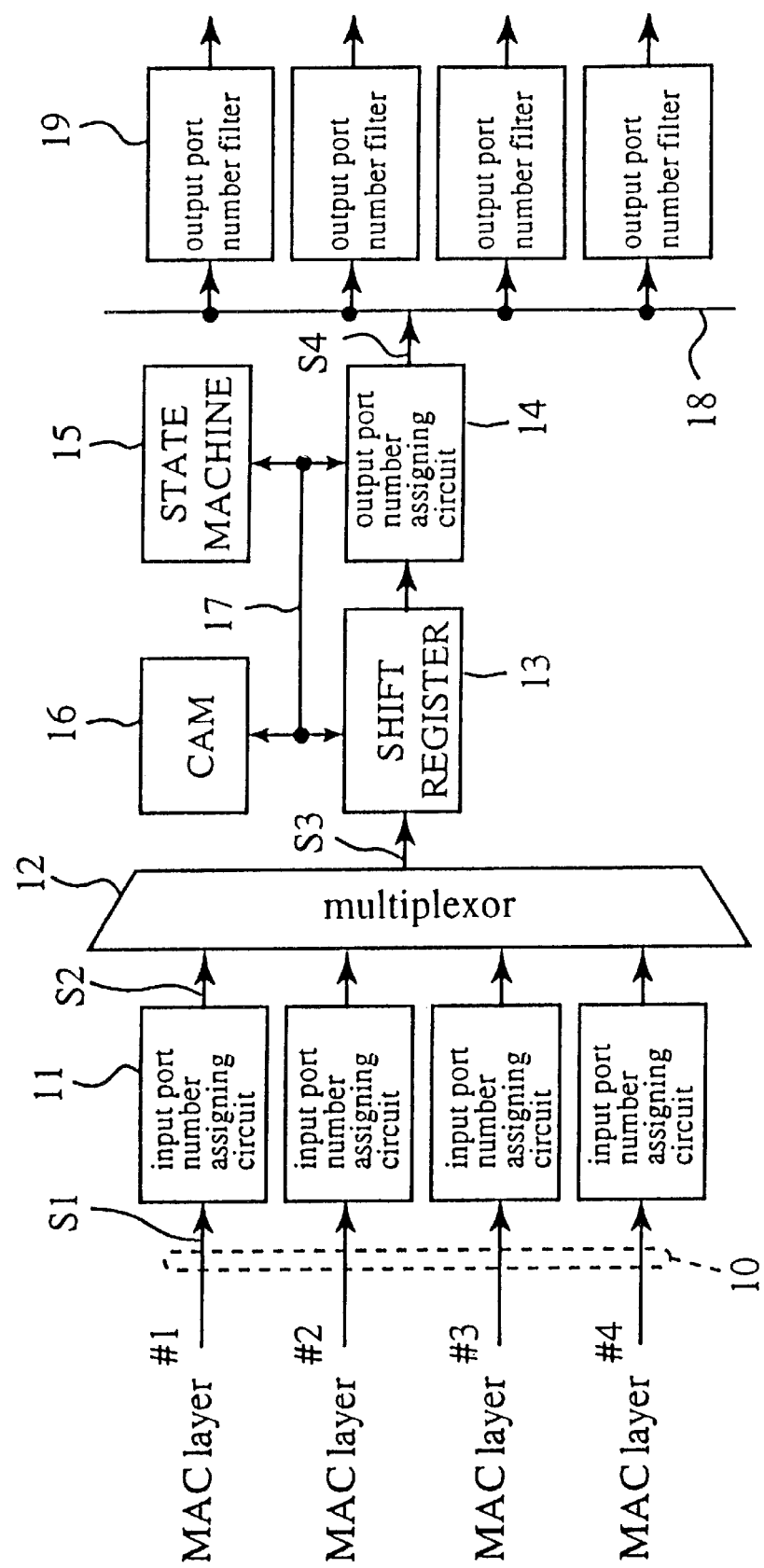
FIG. 2 is a functional block diagram showing the overall configuration of a bridge device of this embodiment.

FIG. 2 is a functional block view showing a configuration of a bridge device of this embodiment. The difference between the bridge device shown in FIG. 2 and the related device is that the bridge device of this embodiment uses only hardware to carry out processing for MAC packetswitching operations.

Interfaces 10 (#1, #2, #3, #4) are circuits corresponding to the ports of different LANs. These interfaces 10 connect the MAC layers of networks connected to each of the ports and this bridge device.

Input port number assigning circuits 11 (#1, #2, #3, #4) are circuits corresponding to each of the interfaces (#1, #2, #3 and #4) that assign input port numbers NI unique to each port to MAC packets received from the MAC layers.

An example of input port numbers NI given by the input port number assigning circuits II are shown in FIG. 3(A) and FIG. 3(B), where DA is the destination address and SA is the source address. FIG. 4 shows an example of the input port numbers NI. In FIG. 4, the left-hand column shows the input port number, the central column shows an example when there are both four input ports and four output ports, and the right-hand column shows an example when there are both eight input ports and eight output ports. In this example, each of the bits from the least significant bit to the most significant bit correspond to each port and the port at which each MAC packet was inputted can be uniquely determined by the position of the bit value "1".

A multiplexor 12 is a circuit for multiplexing the outputs of each of the input port number assigning circuits 11 (#1, #2, #3 and #4). Here, the multiplexor 12 multiplexes the four MAC packets inputted from each of the input port number assigning circuits 11 at at least four times the rate for the MAC packets, as shown in FIG. 3(C), i.e. if the number of ports is n, multiplexing is carried out at at least n times the rate for the MAC packets.

A shift register 13 is a circuit for delaying the multiplexed MAC packets by a fixed time and then transferring the multiplexed MAC packets to an output port number assigning circuit 14. This delay time is a period of time necessary for a state machine 15 and Content-Addressable Memory (hereinafter referred to for simplicity as "CAM") 16 to decide the transmission destination output port.

The output port number assigning circuit 14 is a circuit for assigning port numbers, corresponding to the send destination(s) of MAC packets, to the headers of sequentially inputted MAC packets. Assigned output port numbers are assigned by the combined operation of the output port number assigning circuit 14, the state machine 15 and the CAM 16. Further, the output port number assigning circuit 14 removes the input port numbers NI from the headers and substitutes the output port numbers NO, at the same position as the input port numbers NI were in, when output port numbers NO are being assigned to the MAC packets. The state machine 15 is a controller for managing the operation timing and logic control of the shift register 13, the output port number assigning circuit 14 and the CAM 16.

The CAM 16 also stores the output port numbers NO corresponding to the destination addresses DA in addition to the filtering table (a table holding a combination of the source address and the input port address). A bus 17 is a circuit line connecting the shift register 13, the output port number assigning circuit 14, the state machine 15 and the CAM 16. Output port number filters 19 (#1, #2, #3 and #4) are gate circuits for determining whether or not the output port numbers assigned to the headers of the MAC packets being outputted from the output port number assigning circuit 14 via the bus 18 are the numbers of the ports to which the output port number filters 19 are themselves connected. When an output port number filter 19 (#1, #2, #3 or #4) determines that a send destination of a MAC packet is it's own port, the output port number NO is removed and the MAC packet is sent, with the MAC packet being discarded when this is not the case.

An example of filtering depending on this output port number filter 19 is shown in FIG. 5. The left-hand column in FIG. 5 shows the output port number. The center column shows an example of the case when there are four input ports and four output ports. The right-hand column shows an example when there are eight input ports and eight output ports. With the output port number filter 19 of this example, each bit from the least significant bit to the most significant bit corresponds to each port. An output port number filter 19 can then determine whether or not a MAC packet is intended for it's own port by monitoring whether or not the position of the bit value "I" corresponds to the port to which the output port number filter 19 is itself connected.

A buffer 20 reads the written MAC packet at a speed of a quarter or less than the write speed (if there are n ports, this becomes 1/n or less) and sends these packets to each of the interfaces 21 (#1, #2, #3, #4). Interfaces 21 (#1, #2, #3, #4) then send the MAC packets read from the buffer 20 to MAC layers of an assignment network.

(A-2) Configuration of the output port number assigning circuit 14.

Figure 6:
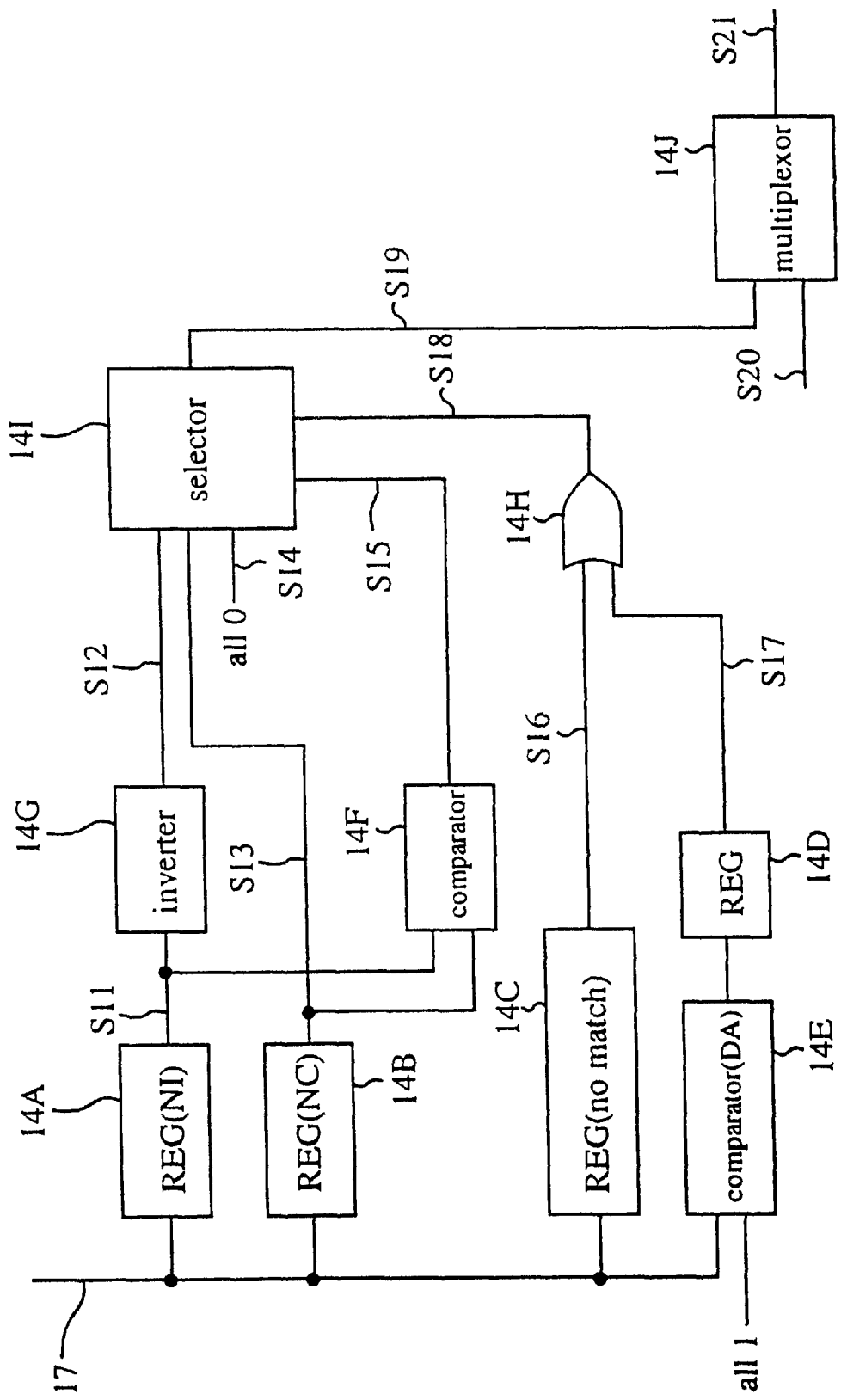
FIG. 6 is a block diagram showing an example of an output port number assigning circuit.

A more detailed description will now be given of the configuration of the output port number assigning circuit 14 described previously. FIG. 6 is a functional block view showing the detailed configuration of this output port number assigning circuit 14.

The output port number assigning circuit 14 comprises a plurality of registers 14A, 14B, 14C and 14D, comparators 14E and 14F, an inverter 14G, an OR circuit 14H, a selector 14I and a multiplexor 14J.

The register 14A is a circuit for latching, via the bus 17, the input port number NI assigned to the MAC packet from the MAC packet being delayed by the shift register 13.

The inverter 14G is a circuit for inverting the value of an input port number S11 latched at the register 14A and providing the inversion results to the selector 14I as an output port number candidate S12. The output port number candidate S12 generated by the inverter 14G is a value where all of the bits other than the bit corresponding to the input port number are "1". When this output port number candidate S12 is then selected all of the ports other than the port used as the input port are then selected as the send destination for the output data.

On the other hand, the register 14B is a circuit for latching, via the bus 17, the destination address DA of the MAC packet being processed and the searched port number NC recorded at the CAM 16. The destination address latched at the register 14B is also supplied to the selector 14I as an output port number candidate S13.

The comparator 14F is a circuit for comparing the addresses latched by the register 14A and the register 14B. The result of this comparison S15 is then a "high" level when both addresses coincide.

The register 14C is a circuit for latching a status signal for when a search is being made regarding whether or not a searched port number NC is recorded together with the destination address DA. This register 14C also supplies a latch output S16 to the OR circuit 14H. The latch output S16 is "high" when the searched port number NC is not yet recorded.

The comparator 14E is a circuit for making a comparison to determine whether or not the destination address DA is a broadcast address (i.e. all bits are "1") designated for outputting to all ports. The results of this comparison are then provided to the OR circuit 14H after being latched at the register 14D. A latch output S17 of the register 14D is then "high" when the destination address coincides with a broadcast address.

The OR circuit 14H that performs an OR operation on the latch output S16 and the latch output S17 therefore provides a "high" level determination signal S18 to the selector 14I when the destination address coincides with a broadcast address or when a searched port address is not yet recorded.

The selector 14I is a circuit for selecting one of the three output port candidates based on the comparison results of the comparator 14F and the OR output S18 of the OR circuit 14H.

The latch output S18 of the OR circuit 14H has a higher priority than the comparison results of the comparator 14F. Therefore, when the latch output S18 is a "high" level, the selector 14I selects the output port number candidate S12 designating ports other than the input port as the output port regardless of the value of the latch output S15 of the comparator 14F.

When the latch output S18 of the OR circuit 14H is a "low" level, the selector 14I selects the output port number candidate S13 expressing the searched port number designating a single port if the latch output S15 of the comparator 14F is a "low" level, and selects the output port number candidate S14 of all bits of "0" if the latch output S15 of the comparator 14F is a "high" level.

The multiplexor 14J is a circuit for adding the output port number S19 selected and outputted by the selector 14I to the header of the MAC packet S20 inputted from the shift register 13. At this time, the multiplexor 14J removes the input port number NI from the MAC packet header and adds the output port number NO to this position.

(B) MAC packet-switching operation

The MAC packet switching operation employing the bridge device of this configuration will now be described with reference to FIG. 7, FIG. 8 and FIG. 9. FIG. 7 is an example of the case where a MAC packet is transmitted, FIG. 8 is an example of the case when a MAC packet is not transmitted and FIG. 9 is an example of the case where the destination address DA is a broadcast address or is not yet recorded in the filtering table.

Figure 7A:
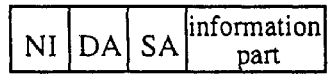
FIG. 7 is a view illustrating an example operation when the destination address is a broadcast address or when the filtering table is not yet recorded.
Figure 7B:
Figure 8A:
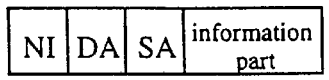
FIG. 8 is a view illustrating an example operation when a MAC packet is transmitted.
Figure 8B:
Figure 8C:
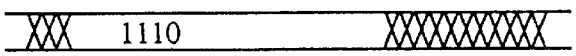
Figure 8D:
Figure 8E:
Figure 8F:
Figure 8G:
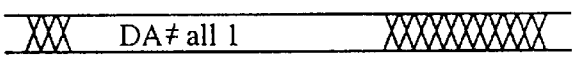
Figure 8H:
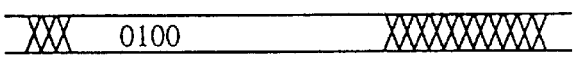
Figure 8I:
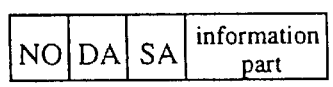

MAC packets that have been timing-arbitrated by the multiplexor 12 are inputted from the interface 10 to the input port number assigning circuits 11. The input port number assigning circuits 11 therefore assigns numbers (NI) unique to each port to the heads of the MAC packets, as shown in FIG. 7(A), FIG. 8(A) and FIG. 9(A).

The multiplexor 12 then sequentially multiplexes the MAC packets with these input port numbers NI attached at a rate of four or more times the bit rate at the interface 10 and outputs the result to the shift register 13.

The shift register 13 delays the time when the multiplexed packets are supplied to the output port number assigning circuit 14 by a fixed time.

The state machine 15 therefore controls the output port number assigning circuit 14 and the CAM 16 and the ports that each of the MAC packets held in the shift register are to be outputted to are obtained.

This process comprises two processes, a learning process and a packet-forwarding process. First, the learning process is executed.

The state machine 15 reads the source addresses assigned to each of the MAC packet headers and the input port numbers NI from the shift register 13 onto the bus 17 and the input port numbers NI are latched at the register 14A comprising the output port number assigning circuit 14.

At the same time, the state machine 15 latches the source address SA and the input port number NI to the CAM 16 and a check is made as to whether or not the source address SA is recorded in the virtual memory.

If the source address SA is not recorded, the state machine 15 causes the group of the source address SA and the input port number NI to be recorded in the CAM 16. If the source address SA is not recorded, the input port number NI is updated. The above is the learning process. Next, the packet-forwarding process is executed.

First, the state machine 15 loads the destination address DA in the header of the MAC packet from the shift register 13 onto the bus 17 and this MAC packet is supplied to the output port number assigning circuit 14 and the CAM 16.

At the output port number assigning circuit 14, the 48-bit destination address DA and a logic value having 48 bits all of "1" are compared at the comparator 14E supplied with this destination address DA and the comparison results are latched at the register 14D.

On the other hand, a check is made at the CAM 16 as to whether or not the destination address DA is already recorded. The results of this check at the CAM 16 are then latched at the register 14C of the output port number assigning circuit 14 as a status signal.

The output port number selection process is then switched over to after this, but when the destination address DA is recorded in the CAM 16, the searched port number NC recorded for the destination address DA is read from the CAM 16 and latched into the register 14B of the output port number assigning circuit 14.

The output port number selection process is described in the following. In the following description, the case where a destination address DA is already recorded is taken to be "match" and the case where a destination address is not yet recorded is taken to be "no match".

First, the case where a destination address DA is recorded at the CAM 16 or the case where it is determined from the comparison results from the comparator 14E that the destination address DA is a broadcast address is described.

This example is shown in FIG. 7, where the input port is taken to be #1, i.e. "0001".

Figure 7C:
Figure 7D:
Figure 7E:
Figure 7F:
Figure 7G:
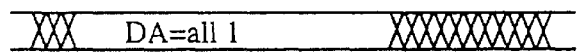
Figure 7H:

In this case, the selector 14I selects an output port number candidate designating all of the ports except the input port and supplies the output port number candidate S12 ("1110" in FIG. 7(C)) to the multiplexor 14J as the output port number S19 (FIG. 7(H)).

The multiplexor 14J then adds this output port number S19 to the MAC packet header inputted from the shift register 13 and outputs the result.

Figure 7I:

This gradated MAC packet is shown in FIG. 7(I).

The MAC packet is supplied to #1 to #4 of the output port number filters 19, passes only through the output port number filters 19 (i.e. only #2 to #4) designated by the output port number NO (i.e. "1110"), is subjected to high-speed adjustments by the buffer 20 and is sent to the MAC layer. This is shown in tables FIG. 8(J) to FIG. 8(M).

The output port number NO is then removed from the MAC packet header at the output stage of the output port number filters 19, the internal processing speed is reduced to a quarter or less at the buffer 20 and the MAC packet is then outputted.

A description will now be given of when the destination address DA is recorded in the CAM 16. In this case, two selections are considered, depending on whether or not the input port number NI and the searched port number NC coincide. Here, the case is described where both port numbers do not coincide.

This example is shown in FIG. 8. In FIG. 8 also, the input port is #1, i.e. "0001" and the searched port number NC is taken to be "0100". The searched port number NC is taken to be "0100".

In this case, the selector 14I is aware of the port the MAC packet is to be sent to. The output port number candidate S13 ("0100" in FIG. 8(D)) supplied from the register 14B is then selected and supplied to the multiplexor 14J as the output port number S19 (FIG. 8(H)).

The operation thereafter is the same as for the aforementioned case but the MAC packet finally only passes through #3 of the interface 21 to be sent, as shown in FIG. 8(J), to FIG. 8(M).

With regards to this, the case where the input port number NI and the searched port number NC coincide is as shown in FIG. 9. In the case in FIG. 9 also, the input port is taken to be #1, i.e. "0001", with the searched port number NC therefore being "0001".

In this case, the selector 14I supplies an output port number candidate S14 of all bits "0" to the multiplexor 14J as an output port number S19 (FIG. 9(H)).

In this case also, an output port number NO is added to the head of the MAC packet and this is outputted from the multiplexor 14J. However, in this case, none of the output port number filters 19 determine themselves to be the destination because all of the bit values are "0". Passage of the MAC packet is therefore halted and the MAC packet is discarded.

In this way, the same packet switching as is carried out in software processing can also be performed by the bridge device of this case comprising only hardware.

According to this embodiment, MAC packet switching can be carried out just using hardware by configuring a bridge device from input port number assigning circuits 11 for assigning port numbers NI unique to each port to MAC packet headers and identifying which ports the MAC packets were inputted at, the content-addressable memory 16 for storing the relationship between the unique port numbers NI and the MAC addresses (including the send addresses SA and the destination addresses DA), the output port number assigning circuit 14 for selecting send destinations for the MAC packets using the content-addressable memory 16 and assigning output port numbers NO to the MAC packets, a state machine for maintaining a continuous control procedure with regards to the output port number assigning circuit 14 and the content-addressable memory 16, and the output port number filters 19 that only allow MAC packets with port number that coincide with their own allotted port numbers to pass.

MAC packet switching can therefore be carried out only in hardware, giving a faster switching operation when compared with the case of executing the same operation using software.

Further, the operation of reading the headers is carried out in parallel with the operation of writing the MAC packets outputted from the input port number assigning circuits 11 and the time necessary for deciding the destination can therefore be made shorter.

MAC packets inputted from each of the ports are multiplexed at the multiplexor 12 and data is read at a rate that is at least the number of ports times greater than the write rate. The time necessary for waiting for the writing of MAC packets being written to end can therefore be made shorter and the switching speed can be increased.

In the above embodiment, each bit from the least significant bit to the most significant bit corresponds to each port and the ports inputting and outputting each MAC packet can be uniquely identified using the position of the bit value "1". However, other rules can be used to assign the port numbers, providing that the positions of the input/output ports are uniquely specified.

Further, the result of a logical OR operation performed on a determination result as to whether or not the destination address is recorded in content-addressable memory (CAM) and a determination result as to whether or not the output port number corresponding to the destination address designates all ports is provided to the selector 14 as a selection signal. However, the present invention is by no means limited in this respect and determination results as to whether or not the destination address is recorded in content-addressable memory only can also be used. Further, in the aforementioned embodiment, the input port number NI is inverted at the inverter 14G and output port number candidates designating all of the ports other than the input port are generated. However, it is also possible to prepare these beforehand in response to each input port.

According to the present invention, MAC packets inputted via each port are assigned input port numbers unique to each port and the output port number is selected based on whether or not the added input port number and the output port number recorded in the content-addressable memory coincide. This is then added to the MAC packet and supplied to the output filters. A bridge device capable of executing packet-switching of MAC packets can therefore be obtained because selection processes based on the existence of registered port numbers or the coincidence of port numbers can be performed just using hardware.

What is claimed is:

1. A bridge device, for connecting a plurality of networks together via data link layers, comprising:

input port number assigning means for assigning input port numbers unique to each port, to headers of inputted memory access control packets;

content-addressable memory means for storing destination addresses and groups of port numbers corresponding to the destination addresses;

determining means for determining whether or not a destination address of a memory access control packet is stored in the content-addressable memory means and determining whether or not a port number corresponding to the destination address coincides with an input port number of the memory access control packet;

selecting means for selecting as an output port number one of: a port number corresponding to the destination address; a port number designating all ports other than the input port; or a port number not designating any ports, based on results of the determinations;

output port number assigning means for assigning an output port number to a memory access control packet; and output filter means allowing passage of only memory access control packets, of sequentially inputted memory access control packets, with self-designating output port numbers.

2. A bridge device according to claim 1, wherein the determining means further determines whether or not the port number recorded for the destination address designates all ports.

3. A bridge device according to claim 1, wherein the memory access control packet is held in a shift register while the determining means decides the output port number.

4. A bridge device according to claim 1, wherein the memory access control packet with the input port number assigned is multiplexed in packet units across all ports and supplied to the determining means.

* * * * *